United States Patent Office 3,322,509
Patented May 30, 1967

3,322,509
METHOD OF REPROCESSING AND/OR SEPA-
RATING NUCLEAR FUELS
Hubert Heinrich Vogg, Karlsruhe, Germany, assignor to
Gesellschaft für Kernforschung m.b.H., a corporation
of Germany
No Drawing. Filed May 15, 1964, Ser. No. 367,923
Claims priority, application Germany, May 15, 1963,
K 49,749; July 6, 1963, K 50,148
17 Claims. (Cl. 23—325)

The invention relates to a method of reprocessing and/or separating nuclear fuels, e.g., uranium and plutonium, and uranium and thorium which, in addition, may contain molybdenum metal and, in the reprocessing of irradiated fuels, may also contain cesium, cerium, ruthenium, zirconium, and niobium. Metal fuels may exhibit additions of molybdenum as an alloying constituent, and ceramic nuclear fuels, such as $UO_2$, $PuO_2$ and $THO_2$, may have molybdenum added as a structural material for improving heat transfer. Moreover, molybdenum may also be present as a canning material of the fuel elements.

All previously known methods of reprocessing nuclear fuel containing molybdenum start from the use of concentrated or dilute acids for decomposing the nuclear fuels. Nitric acid is the acid usually employed in this process. This leads to oxidation of the molybdenum and its precipitation as a white precipitate of the molybdic acid, or molybdenum oxide. The voluminous precipitate hinders the recovery of the fissile material because it retains a relatively large portion of such material, by adsorption. Another disadvantage associated with acid decomposition is that there is a limit to the molybdenum percentage of the fuel. Thus, the practical feasibility of such decomposition is possible only up to a molybdenum content of 10 percent in the fuel. Up to 3 percent content the molybdenum may just be kept in solution by means of a complexing agent, e.g., ferric nitrate. Yet, this process also has considerable drawbacks because the final solution obtained is characterized by a certain instability and thus results in much uncertainty in each subsequent reprocessing step, particularly in the extraction process which follows.

Moreover, in the process of decomposition with acid, all fission products pass into the solution together with the nuclear fuels. The fission products hereinbefore mentioned, i.e., cesium, cerium, ruthenium, zirconium, and niobium, contribute a major portion of the total activity and thus are primarly responsible for the partial radiation disintegration of the organic extracting agent. Zirconium and ruthenium in particular cause considerable difficulties in the subsequent extraction step owing to their poor distribution coefficients.

Finally, the well-known methods of separating nuclear fuels, e.g., uranium and plutonium, or uranium and thorium, respectively, by acid decomposition entail a considerable outlay in equipment as they require a relatively large number of individual treatment steps.

It is an object of the invention to provide a method of reprocessing and/or separating nuclear fuels which is largely independent of the type of nuclear fuel and the percentage of molybdenum and which permits dissolution of the fuel elements at an economically reasonable expenditure, while, at the same time, reducing the loss of nuclear fuel. At the same time it is intended to obtain the Cs–137 contained in irradiated nuclear fuels in its substantially pure form. The most disturbing fission products, i.e., cerium, ruthenium, zirconium, and niobium, may be separated in the decomposition of the nuclear fuel starting the reprocessing procedure.

According to the invention the nuclear fuel is decomposed in a fused alkaline salt system containing oxidizing agents. As oxidizing agent preferably alkalinitrate, and as alkaline component preferably hydroxides or carbonates are employed. Actually, it is also possible to use only alkalinitrate for both, since alkalinitrate is decomposed at high temperatures to a small amount, whereby the melt shows a slightly alkaline reaction.

In the case of the separation of molybdenum it is particularly advantageous to use a nitrate-carbonate melt or nitrate-hydroxide melt. Other oxidizing agents, too, such as peroxides, chlorates, perchlorates or alkali may be employed in connection with alkali carbonates, alkali hydroxides etc. In the process according to the invention molybdenum, as well as the nuclear fuels, is transformed into the highest possible stage of oxidation. In addition, the process according to the invention permits the reprocessing of molybdenum cans together with the fuel.

The next step of the procedure provides for the solid, cooled melt to be leached, e.g., in water with the molybdenum becoming dissolved together with the excess of salts and together with the fission cesium. The nuclear fuels proper are insoluble in water. After separation of the precipitate from the mother liquor the molybdenum content of the precipitate is very low and can be reduced to a minimum of 0.1 percent of the original molybdenum content by washing with water or dilute caustic soda solution. The washed precipitate can then be dissolved very easily in the acid found to be suitable for the extraction process selected. In this way it is possible to adjust the fuel and acid concentration in the feed solution to any value. After decomposition of the fuel, only Mo and Cs are commonly dissolved in the subsequent leaching step with water or caustic soda solution. The isolation of Cs is easily possible by separating it from Mo. This can be done by well-known processes, e.g., by adding phosphoric acid and thus precipitating Cs-phosphorus molybdate, the salt of a heteropolyacid, and then separating Cs from the heteropolyacid again by separation via an ion exchanger. At low burnup values, when only tracer amounts of Cs–137 are present in the nuclear fuels, it is necessary to add, small carrier amounts of Cs to the melt. However, at high degrees of burnup such as can be attained, e.g., in fast breeder reactors, Cs–137 is already present in weighable quantities so that no addition of carrier substances is required. This latter case thus is especially well suited for the production of extremely high specific activities of Cs–137. By processing as above Cs enters the mother liquor quantitatively and can easily be isolated by separation from the precipitate and mother liquor. If the treatment concerns nuclear fuels which had cooled off for at least 100 days, Cs–137 is free from other fission products.

The process according to the invention may be used to advantage also when only Cs-137 is to be isolated from irradiated nuclear fuels, i.e., when there is no molybdenum at all in the nuclear fuel. The additional process described above for separating Cs–137 from molybdenum then becomes unnecessary.

At the same time, the process according to the invention makes it possible to obtain predecontamination of the nuclear fuel to be reprocessed by separating the fission products cerium, ruthenium, zirconium, and niobium by leaching the solid, cooled melt with water or caustic soda and then treating the remaining nuclear fuel residue with dilute acid. This results in dissolution of the nuclear fuel, whereas the fission products remain in an insoluble form. The decontamination factors that may be attained in the process according to the invention for the fission products mentioned above are around $10^1$–$10^4$.

It is also possible by employing the process according to the invention to separate nuclear fuels in a particularly simple way. If it is intended to separate Pu and U, or Th and U from each other, it is sufficient to employ a pure nitrate or nitrite melt. At a temperature of some 500° C. uranium is converted to uranates which may easily be dissolved in dilute nitric acid and separated. Under the reaction conditions mentioned above, Pu and Th form oxides which are insoluble in weak nitric acid and therefore remain in the residue.

It should be possible to separate plutonium by decomposing the nuclear fuel in a melt of $NaNO_3$—NaOH at 800° C. At that temperture plutonium is oxidized and decomposed to plutonate which enters into solution in water when the melt is leached, whereas the uranium remains insoluble in water as a uranate.

The process according to the invention is explained in more detail in the following examples. The quantities and figures mentioned therein, however, are not meant to be limitations of the invention. On the contary, it is possible under the guiding rules mentioned above to perform the process successfully also in a modified way.

Example 1

68.4 g. U with 19.6 g. Mo as an alloy are fed into an oxidizing alkaline melt consisting of 100 g. sodium nitrate and 52 g. sodium bicarbonate. During the reaction it is kept at a temperature of some 500 to 600° C. After decomposition the melt is cooled off and leached with water. After separation of the precipitate and mother liquor the precipitate is washed with water. Uranium concentration in the mother liquor and in the wash water is zero. Molybdenum concentration of the precipitate is 0.29 mg. molybdenum per gram uranium, i.e., less than 0.1 percent the total molybdenum content of the alloy.

Example 2

Instead of an uranium-molybdenum alloy a pellet of uranium oxide $UO_2$ and molybdenum is employed. The pellet weighs 4.15 g. and contains 3.32 g. uranium oxide and 0.83 g. molybdenum, and it is decomposed as described in Example 1 and treated in the same way. The results obtained are practically identical.

Example 3

A pellet of molybdenum, uranium oxide, and plutonium oxide is decomposed in a melt of sodium nitrate at a temperature in the range 350–450° C. The melt contains 0.38 g. Mo, 1.24 g. $UO_2$, 0.28 g. $PuO_2$, and 5.3 g. sodium nitrate. The results with respect to the concentration of molybdenium in the precipitate and to the concentration of fissile material in the mother liquor are practically the same as those of Examples 1 and 2.

Example 4

2.5 g. of unirradiated $UO_2$ together with 36.4 mg. $CsNO_3$ radioactively labeled with Cs-137 are fed into a melt of 5 g. $NaNO_3$. The activity of the Cs fed in is 343,800 c.p.m. The mixture is made to react at about 500° C. and leached with water after the melt has cooled off. After separation of the precipitate from the mother liquor the following activity values were obtained (figures rounded off): Mother liquor—340,510 c.p.m., precipitate—2,500 c.p.m. From this it follows that Cs-137 enters the mother liquor almost quantitatively and thus can be separated from uranium and the fission products.

Example 5

Example 4 is repeated, but using 2.5 g. $UO_2$—Mo powder containing 15 w./o. Mo. When leached with water or, even better in this case, with dilute caustic soda solution Cs and Mo enter into a common solution. The activity of Cs-137 in the precipitate is 1 percent of the initial activity.

For separating the cesium and molybdenum, the following procedure is adopted: Some phosphoric acid and nitric acid are added so as to precipitate $Cs_2HPMo_{12}O_{40}$. The precipitate is dissolved in ammonia, and the cesium-cation is separated from the heteropolyacid by means of a cation exchanger, like Dowex. The Cs is fixed on the ion exchanger whereas the heteropolyacid containing the molybdenum could be eluted by use of fairly alkaline wash solutions.

Example 6

2.5 g. of uranium oxide powder irradiated in a reactor for 100 days under a flux of $6.5 \cdot 10^{12}$ n./cm.$^2$ sec. and cooled off for 100 days are fed into a melt of 5 g. sodium nitrate together with 36.4 mg. cesium nitrate as a carrier are fed into a melt consisting of 5 g. $NaNO_3$, and the reaction is carried out in a way analogous to that in Example 1. Gamma-spectroscopical investigations in a one-channel spectrometer showed that no Cs–137 was detectable in the precipitate. However, the activity of the mother liquor consists of Cs–137 exclusively.

Example 7

The decontamination factors for the fission products Cs, cerium, ruthenium, zirconium, niobium were determined in experiments starting from $UO_2$ where the fission product concerned was radioactively labeled and added with such an amount of carrier material as to correspond to the amount formed after a burnup of 100,000 MWd/t.

(a) 1.77 g. $UO_2$ were homogeneously mixed with 12 mg. cerium (in the form of cerium nitrate labeled with Ce–144) and made to react in a melt of 4.8 g. $NaNO_3$. The reaction was terminated after two hours. After cooling off, the melt was leached with water and the uranium was dissolved in dilute acid. Cerium remained insoluble in the residue. By comparison of the solution and residue a decontamination factor of 216 was determined.

(b) Experiment (a) is repeated, but with ruthenium added instead of cerium, the quantities used for the experiment being 1.78 g. $UO_2$, 17.8 mg. Ru (in the form of ruthenium chloride labeled with Ru–106) and 4.8 g. $NaNO_3$. Ruthenium remained insoluble in the residue. The decontamination factor obtained was 135.

(c) Experiment (a) is repeated, but with zirconium added instead of cerium. The quantities used for the experiment are 1.77 g. $UO_2$, 13.6 mg. Zr (in the form of zirconium oxynitrate labeled with Zr–95), 4.8 g. $NaNO_3$. Zirconium remained insoluble in the residue. The decontamination factor obtained was at least $10^3$.

(d) Experiment (a) is repeated, but with niobium added instead of Ce. The quantities used for the experiment are 1.76 g. $UO_2$, 0.4 mg. niobium (in the form of niobium oxalate labeled with Nb–95), 4.8 mg. $NaNO_3$ Niobium remained in the residue. The decontamination factor obtained was 9.

Example 8

1.76 g. $UO_2$ were irradiated in a reactor for one hour under a flux of $6.5 \times 10^{12}$ n./cm.$^2$ sec. and decomposed in a melt of 5 g. sodium nitrate and at a temperature of 500° C. In order to similate burnup of 100,000 MWd/t., corresponding amounts of fission elements as inactive carrier substance added on starting the reaction.

The decontamination factors determined in a stripping process by means of multi-channel analysis were (a) 10 for cerium;
(b) 100 for ruthenium;
(c) 40 for zirconium and niobium.

Comparable decontamination factors were also found by using melts of $NaNO_3$—$Na_2CO_3$ and $NaNO_3$—NaOH.

Example 9

1.097 g. $PuO_2/UO_2$ mixture (produced by homogeneous mixing of 137 mg. $PuO_2$ and 960 mg. $UO_2$) were fed into an oxidizing melt consisting of 3–4 g. $NaNO_3$. During the reaction the melt is kept at a temperature in the range 500–550° C. After decomposition, the melt is cooled and leached with water. After separation of precipitate and mother liquor the precipitate was washed with water. The concentration of uranium and of plutonium in the aqueous mother liquor as well as in the washing water was zero. Afterwards, the precipitate was dissolved in 10 ml. of 1 n $HNO_3$ with 99.9 percent of uranium (present in the form of $Na_2U_2O_7$ due to reaction in the melt) dissolving, whereas the plutonium present in the form of $PuO_2$ remained, quantitatively insoluble in the residue.

*Example 10*

Example 9 is repeated, but with 3–4 g. $NaNO_2$ used instead of $NaNO_3$. In this case a reaction temperature of 300° C. was sufficient. The course of the reaction and the results corresponded to those obtained in Example 9.

*Example 11*

Example 9 is repeated, but with $ThO_2$ instead of $PuO_2$. 1.35 g. $UO_2$–$ThO_2$ (produced by homogeneous mixing of 1.15 g. $ThO_2$ and 0.2 g. $UO_2$) were made to react in a melt consisting of 3–4 g. $NaNO_3$. Further treatment was carried out as described in Example 9. Uranium dissolved quantitatively in dilute acid, thorium in the form of $ThO_2$ remained quantitatively in the residue.

I claim:

1. A method of reprocessing nuclear fuels which comprises decomposing a nucelar fuel in a fused alkaline salt system containing oxidizing agents, and separating said fuel from said salt system.

2. A method according to claim 1, in which the decomposition is effected in a mixture of at least one alkali metal salt and an oxidizing agent.

3. A method according to claim 1, in which an alkali metal salt melt selected from at least one member of the group consisting of nitrates and nitrites is employed as the fused salt system.

4. A method according to claim 1, in which a melt of a mixture of an alkali metal carbonate and an alkali metal nitrate is employed as the fused salt system.

5. A method according to claim 1, in which a melt of a mixture of an alkali metal hydroxide and an alkali metal nitrate is employed as the fused salt system.

6. The method according to claim 1, in which said nuclear fuel comprises uranium and plutonium.

7. The method according to claim 1, in which said nuclear fuel comprises uranium and thorium.

8. The method according to claim 1, in which said nuclear fuel contains molybdenum.

9. The method according to claim 1, in which the nuclear fuel is an irradiated fuel containing at least one member selected from the group consisting of cesium, cerium, ruthenium, zirconium and niobium fission products.

10. A method according to claim 1, for the isolation of substantially pure Cs–137 from nuclear fuel having a low burnup, in which a small amount of inactive cesium is added as a carrier to said melt.

11. A method according to claim 1 for the predecontamination of nuclear fuel to be reprocessed by separation of fission products selected from at least one member of the group consisting of cerium, ruthenium, zirconium and niobium, in which a solid cooled melt is obtained and is leached with a member selected from the group consisting of water or caustic soda solution and the nuclear fuel remaining after said leaching is treated with dilute acid to dissolve said nuclear fuel and to leave said fission products as a residue.

12. A method according to claim 1 for separating uranium, in which a solid cooled melt is obtained and extracted with an acid.

13. A method according to claim 12, in which the acid is dilute nitric acid.

14. A method of reprocessing nuclear fuels which comprises decomposing in an alkaline salt system containing an oxidizing agent, a nuclear fuel containing at least one member selected from the group consisting of molybdenum; and cesium, cerium, ruthenium, zirconium and niobium fission products, obtaining a cooled melt of said salt, said oxidizing agent and said fuel in said decomposing step, leaching said melt with at least one member selected from the group consisting of water and caustic soda solution, and separating the precipitate thereby obtained from the mother liquor which contains at least one member selected from the group consisting of dissolved molybdenum and dissolved Cs–137.

15. A method according to claim 14, for the reprocessing of fuels containing Cs–137 as a fission product, in which the Cs–137 is precipitated from said mother liquor in the form of $Cs_2HPMo_{12}O_{40}$ and immediately afterwards is isolated from the phosphorous molybdic acid by ion exchange.

16. A nuclear fuel prepared by the steps comprising decomposing a processed nuclear fuel in a fused alkaline salt system containing oxidizing agents and separating said fuel from said salt system.

17. A nuclear fuel prepared by the steps comprising decomposing an irradiated nuclear fuel in a fused alkaline salt system containing oxidizing agents and separating said fuel from said salt system.

References Cited

UNITED STATES PATENTS 3,154,379 10/1964 Benedict et al. _____ 23—14.57

CARL D. QUARFORTH, *Primary Examiner.*

REUBEN EPSTEIN, L. DEWAYNE RUTLEDGE, LEON D. ROSDOL, BENJAMIN R. PADGETT,
*Examiners.*

M. J. SCOLNICK, *Assistant Examiner.*